United States Patent
Makita et al.

(10) Patent No.: US 6,971,905 B2
(45) Date of Patent: Dec. 6, 2005

(54) FIXING MEMBER AND A CONNECTOR

(75) Inventors: Yasumitsu Makita, Yokkaichi (JP);
Yasushi Okayasu, Yokkaichi (JP);
Izumi Suzuki, Yokkaichi (JP); Hideshi Tachi, Yokkaichi (JP)

(73) Assignee: Sumitomo Wiring Systems, Ltd., (JP)

( * ) Notice: Subject to any disclaimer, the term of this patent is extended or adjusted under 35 U.S.C. 154(b) by 0 days.

(21) Appl. No.: 10/793,114

(22) Filed: Mar. 4, 2004

(65) Prior Publication Data

US 2004/0219821 A1 Nov. 4, 2004

(30) Foreign Application Priority Data

May 3, 2003 (JP) .............................. 2003-058287

(51) Int. Cl.[7] ............................................ H01R 13/56
(52) U.S. Cl. ...................................... 439/447; 439/587
(58) Field of Search ................................ 439/274, 275, 439/382, 445, 447, 465, 467, 587, 589

(56) References Cited

U.S. PATENT DOCUMENTS

| | | | |
|---|---|---|---|
| 3,617,615 A | * | 11/1971 | Balzer .......................... 174/87 |
| 5,908,327 A | | 6/1999 | Tsuji et al. |
| 5,967,829 A | * | 10/1999 | Shinchi ....................... 439/467 |
| 6,485,333 B1 | * | 11/2002 | Shinchi ....................... 439/587 |
| 6,568,967 B2 | | 5/2003 | Inaba et al. |

* cited by examiner

Primary Examiner—Khiem Nguyen
(74) Attorney, Agent, or Firm—Gerald E. Hespos; Anthony J. Casella

(57) ABSTRACT

Female terminal fittings (15) crimped into connection with ends of wires (W) are accommodated in a female housing (10). The wires (W) drawn out from the female housing (10) are surrounded by a corrugate tube (30). The corrugate tube (30) is fixed to the female housing (10) via a cover (40). The cover (40) has a main body (41) and a lid (42) that can open and close the main body (41). The main body (41) and the lid (42) have rubber plates (55) to hold wires (W) resiliently therebetween as the lid (42) is closed.

13 Claims, 8 Drawing Sheets

US 6,971,905 B2

FIXING MEMBER AND A CONNECTOR

BACKGROUND OF THE INVENTION

1. Field of the Invention

The invention relates to a fixing member for fixing a corrugate tube to a housing and to a connector provided with such a fixing member.

2. Description of the Related Art

U.S. Pat. No. 5,908,327 shows a connector with a housing that accommodates terminal fittings. The terminal fittings are connected respectively to wires that extend from the rear end of the housing and through a corrugate tube. The connector also includes a cover that is comprised of a pair of half-pieces. The front end of the corrugate tube is held between the half-pieces to fix the corrugate tube to the housing.

A device may be connected with the end of the wire spaced from the housing. The device may be mounted in a place that vibrates frequently. Thus, there is a possibility that vibrations transmitted along the wire will adversely affect the terminal fitting in the housing. Therefore, there has been a demand for a countermeasure.

The present invention was developed in view of the above problem and an object thereof is to prevent the transmission of vibration through a wire.

SUMMARY OF THE INVENTION

The invention relates to a fixing member for fixing connector. The connector includes a housing, and at least one wire is drawn out from the housing. A protection tube surrounds the wire drawn out from the housing. The fixing member fixes the protection tube to the housing and comprises at least one resilient holding portion for resiliently holding the wire. Thus, vibration transmitting along the wire can be absorbed satisfactorily.

The resilient holding portion preferably comprises two resilient plates that hold the wire therebetween. Thus, the wire is difficult to damage and can satisfactorily absorb vibration.

The resilient holding portion preferably comprises two springs that hold the wire therebetween. The springs may be formed integrally or unitarily in the fixing member. Thus, production costs are low as compared to a connector with a separate resilient holding portion mounted on a fixing member.

Chamfered or rounded surfaces preferably are formed at the front and rear edges of the springs. Further, the springs preferably are formed substantially into a U- or bridge-like shape.

The resilient holding portions preferably have a resiliency about equal to or slightly softer than a resiliency of an insulation coating of the wire.

The fixing member preferably has at least one positioning portion that bulges in more than a front end of the protection tube. The positioning portion can position the wire to a position more inward than the front end of the protection tube.

The fixing member may further comprise at least one temporarily holding means for temporarily holding the protection tube during mounting.

The invention also relates to a connector comprising a protection tube for surrounding at least one wire drawn out from a housing, and the above-described fixing member for fixing the protection tube to the housing.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A first embodiment of the present invention is described with reference to FIGS. 1 to 4. This embodiment is directed to a connector with a cover 40 for fixing a corrugate tube 30 to a female housing 10. In the following description, a direction FD of mounting the cover 40 onto the female housing 10 is referred to as a forward direction (leftward in FIGS. 1 and 2).

Figure 1:
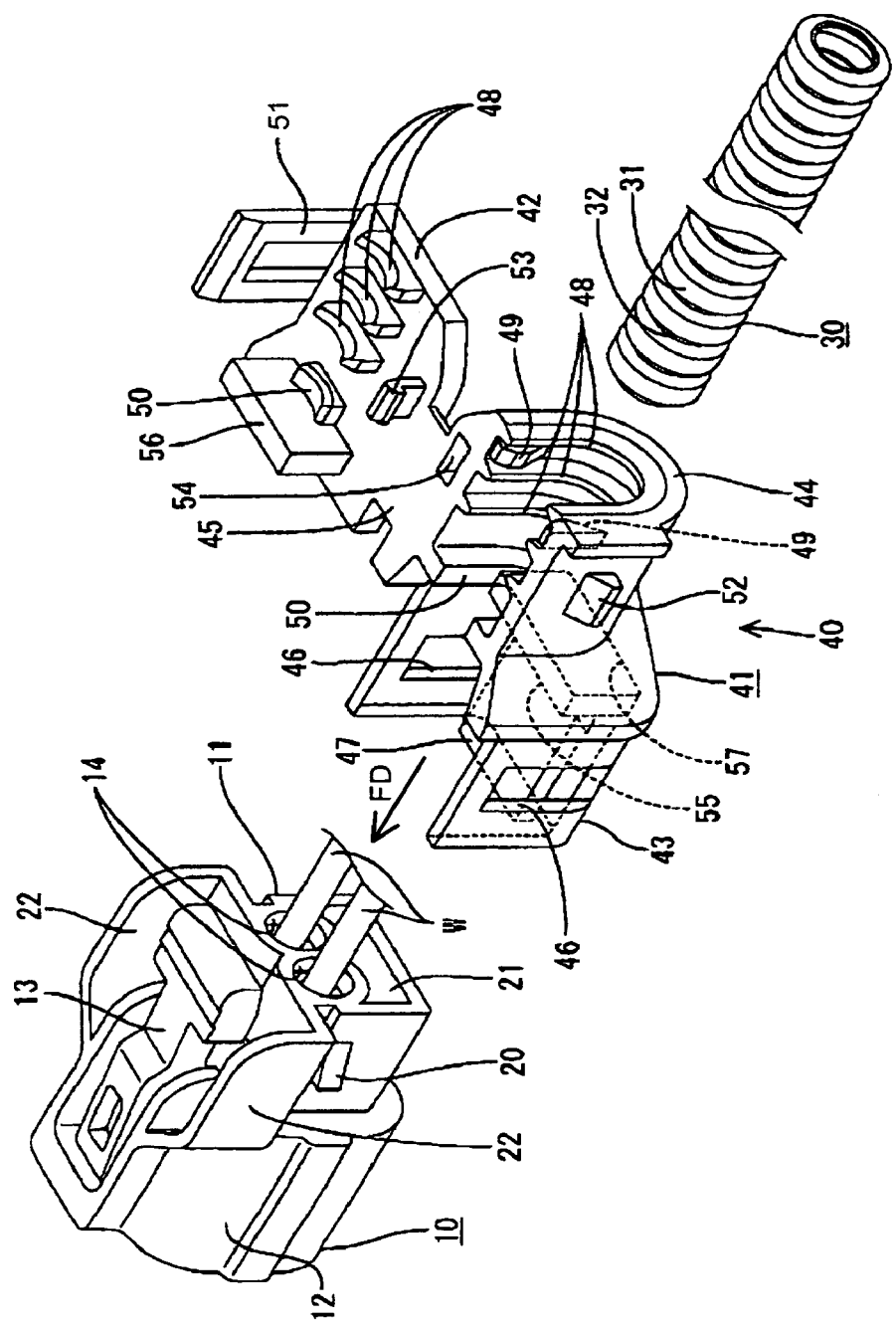
FIG. 1 is an exploded perspective view of a connector according to a first embodiment of the invention.
Figure 2:
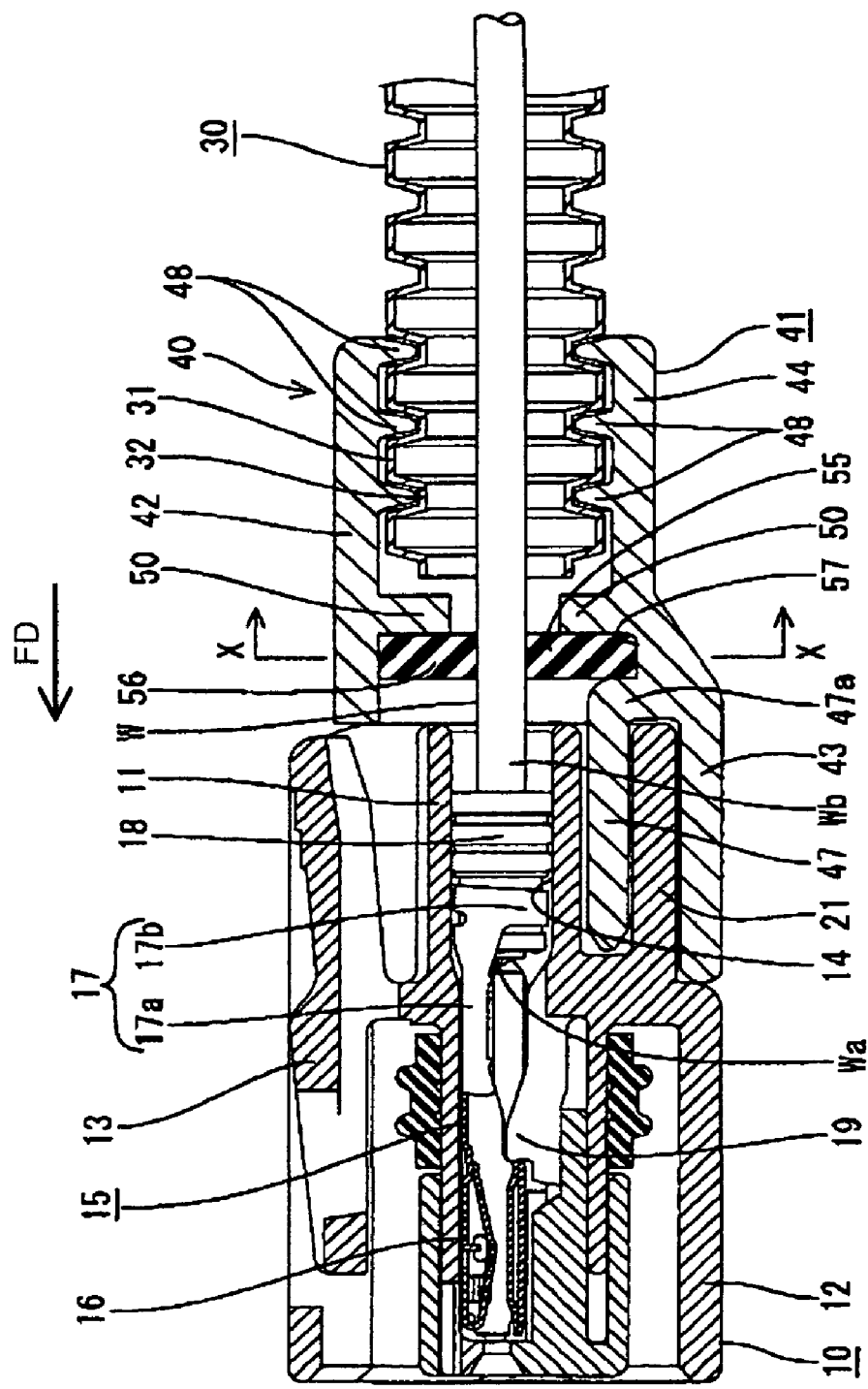
FIG. 2 is a side view in section of the connector.

The female housing 10 is made e.g. of a synthetic resin and includes a terminal accommodating portion 11 and a forwardly open receptacle 12. The receptacle 12 is coupled to a longitudinal middle of the terminal accommodating portion 11 and projects forward to surround a front part of the terminal accommodating portion 11, as shown in FIGS. 1 and 2. An unillustrated mating male housing is fittable into the receptacle 12 from the front. A lock arm 13 projects from the upper surface of the terminal accommodating portion 11 for holding the male housing in the receptacle 12.

Cavities 14 are arranged substantially side by side along a widthwise direction in the terminal accommodating portion 11 and female terminal fittings 15 are insertable into the cavities 14 from behind. Each female terminal fitting 15 is press-formed of a conductive metallic plate, and has a main portion 16 and a barrel 17 connected one after the other. The main portion 16 is substantially tubular and is connectable with a mating male terminal fitting (not shown). The barrel 17 includes two front crimping pieces 17a and two rear crimping pieces 17b. The front crimping pieces 17a are configured for crimped connection with a core Wa of a wire W, whereas the rear crimping pieces 17b are configured for crimped connection with a waterproof rubber plug 18 mounted on an insulation coating Wb of the wire W. The waterproof rubber plug 18 closely contacts the inner surface of the cavity 14 to seal the female terminal fitting 15. The female terminal fitting 15 is locked in the cavity 14 by engaging a locking portion 19 projecting at the bottom side of the cavity 14.

The cover 40 is mountable from behind, on a bottom part of the rear half of the terminal accommodating portion 11, which is not surrounded by the receptacle 12. Two locks 20 project laterally from the outer surface of the terminal accommodating portion 11 for holding the cover 40. The rear surface of each lock 20 slopes out towards the front in the fitting direction FD to guide the mounting of the cover 40. However, the front surface of each lock 20 defines a locking surface for the cover 40 and is substantially normal to the fitting direction FD. A tubular portion 21 opens back at the bottom of the rear half of the terminal accommodating portion 11. Further, two protecting portions 22 bulge out sideways and up at an upper part of the rear half of the terminal accommodating portion 11 for protecting the lock arm 13.

The corrugate tube 30 is made e.g. of a synthetic resin, and defines a bellows with alternating circumferential grooves 31 and projections 32 on the outer circumferential surface thereof. Thus, the corrugate tube 30 is flexible and resiliently deformable while curving its longitudinal axis. The corrugate tube 30 surrounds the wires W drawn out backward from the female housing 10, so that the wires W are protected without being exposed to the outside.

The cover 40 is made e.g. of a synthetic resin and has a main body 41 and a lid 42 that can open and close the main body 41. The main body 41 has a housing holding portion 43 at one end and a tube holding portion 44 at the other end. The holding portions 43 and 44 each have a substantially U-shaped cross section that opens up. A portion of the main body 41 between the holding portions 43, 44 has a width and height that gradually increases from the tube holding portion 44 towards the housing holding portion 43. The lid 42 is coupled to the tube holding portion 44 via a thin hinge 45.

The housing holding portion 43 is mountable to substantially cover the lower part of the rear half of the terminal accommodating portion 11 from opposite lateral sides and the bottom. A lock hole 46 is formed in each side wall and is engageable with the corresponding lock 20. An insertable plate 47 projects from the bottom wall of the housing holding portion 43 and is insertable into the tubular portion 21 to suppress vertical or lateral shake of the cover 40. The insertable plate 47 includes a standing portion 47a that projects up from the bottom wall. A flat portion cantilevers forward from the standing portion 47a and is coupled to the opposite side walls of the housing holding portion 43.

The tube holding portion 44 can accommodate the corrugate tube 30 while substantially covering the corrugate tube 30 from opposite lateral sides and the bottom. The tube holding portion 44 substantially aligns with the top of the corrugate tube 30 accommodated to a proper depth. The bottom wall of the tube holding portion 44 has a substantially arcuate shape extending along the corrugate tube 30, whereas the opposite side walls are substantially straight. The hinge 45 projects sideways at the upper end of the right side wall in FIG. 1, and the lid 42 is coupled to the end of the hinge 45. The lid 42 can close the open portion of the tube holding portion 44 by being turned toward the main body 41 while bending the hinge 45.

Three locks 48 are provided substantially circumferentially on the inner surface of the tube holding portion 44 of the main body 41 at specified intervals along the longitudinal length of the main body 41 from the rear end. The intervals substantially correspond to the intervals of the grooves 31 of the corrugate tube 30. The locks 48 engage the grooves 31 of the corrugate tube 30 so that the corrugate tube 30 cannot move forward and backward. Three locks 48 that have a similar function project at positions on the lid 42 substantially in registration with the respective locks 48 on the main body 41. Two temporary holding projections 49 are provided on the inner surface of the tube holding portion 44 between the last lock 48 and the middle lock 48. The temporarily holding projections 49 substantially face each other at upper ends of the tube holding portion 44, and are engageable with opposite ends of the projection 32 of the corrugate tube 30 accommodated in a proper position. Thus, the corrugate tube 30 can be held temporarily in its properly accommodated state. A positioning portion 50 is provided circumferentially at the front end of the inner surface of the tube holding portion 44. The positioning portion 50 bulges in more than the front end groove 31 of the accommodated corrugate tube 30 and can position the wire W to a position more inward than the front end of the corrugate tube 30. The positioning portion 50 also is larger than the groove 31 of the corrugate tube 30 along forward and backward directions. A positioning portion 50 with a similar function projects from the lid 42 substantially in registration with the positioning portion 50 of the tube holding portion 44.

A holding arm 51 projects from a side of the lid 42 opposite from the hinge 45. The holding arm 51 engages a holding portion 52 that projects from an outer side surface of the tube holding portion 44 substantially opposite the hinge 45 for holding the lid 42 closed. An auxiliary holding arm 53 projects from the lid 42 at a position near the hinge 45 and is engageable with an auxiliary holding hole 54 formed at a position of the tube holding portion 44 near the hinge 45 when the lid 42 is closed properly.

The cover 40 has two resilient rubber plates 55, 56 and a part of each wire W between the female housing 10 and the corrugate tube 30 is held resiliently between the rubber plates 55, 56. The rubber plate 55 is mounted in a mounting groove 57 in a portion of the main body 41 between the standing portion 47a of the insertable plate 47 and the positioning portion 50. The rubber plate 55 is dimensioned to be compressed slightly during insertion into the rubber plate mounting groove 57, and hence is prevented from coming out of the mounting groove 57. The rubber plate 56 is fixed by adhesive or a clamping means at a position on the lid 42 immediately before the positioning portion 50. The rubber plate 55 has a height to reach a position where the wire W is to be arranged and the wire W can be held resiliently between the rubber plates 55, 56 (see FIG. 4). The rubber plates 55, 56 are supported along the fitting direction FD by the respective positioning portion 50.

The female housing 10 and the cover 40 are made of a relatively hard resin. However, the rubber plates 55, 56 are made of a soft resin whose hardness is about equal to or slightly softer than that of the resin used for the insulation coating Wb of the wire W. A vibration may be applied to the wire W. However, the wire W is held resiliently between the rubber plates 55, 56. Thus, the vibration is absorbed without damaging the insulation coating Wb of the wire W.

The connector is assembled by connecting the female terminal fittings 15 with the front ends of the wires W. The female terminal fittings 15 then are inserted into the respective cavities 14 and the wires W are introduced through the corrugate tube 30. The locks 19 lock the female terminal fittings 15 that have been inserted to a proper depth, and the waterproof rubber plugs 18 are held in close contact with the inner circumferential surfaces of the cavities 14, thereby sealing the cavities 14 (see FIG. 2).

Next, the rubber plates 55, 56 are mounted in the cover 40 and the cover 40 is pushed forward towards the female housing 10 in the fitting direction FD from the state shown in FIG. 1. Thus, the inner surface of the housing holding portion 43 slides in contact with the outer surface of the terminal accommodating portion 11. Additionally, the insertable plate 47 is inserted into the tubular portion 21. Opposite side walls of the housing holding portion 43 move onto the corresponding locks 20, and deform radially outward to open sideways. Thereafter, the opposite side walls are restored so that the locks 20 fit into the lock holes 46 and the front surfaces of the locks 20 engage the front edges of the lock holes 46. At this time, portions of the wires W drawn out backward from the female housing 10 are on the rubber plate 55.

The corrugate tube 30 then is fit into the tube holding portion 44 of the cover 40 from above so that the front end of the corrugate tube 30 is behind the positioning portion 50 and the locks 48 are in the corresponding grooves 31. The temporary holding projections 49 temporarily deform the projection 32 of the corrugate tube 30 resiliently inward during the fitting process. The locks 48 engage the corresponding grooves 31 and the temporary holding projections 49 engage the opposite sides of the projection 32 when the corrugate tube 30 is accommodated to a proper depth. Thus, the corrugate tube 30 is held temporarily so as not to shake forward, backward and/or up. At this time, the upper sides of the corrugate tube 30 and the tube holding portion 44 are substantially flush with each other. Alternatively, the corrugate tube 30 may first be fitted and then the cover 40 may be fixed to the female housing 10.

Figure 3:
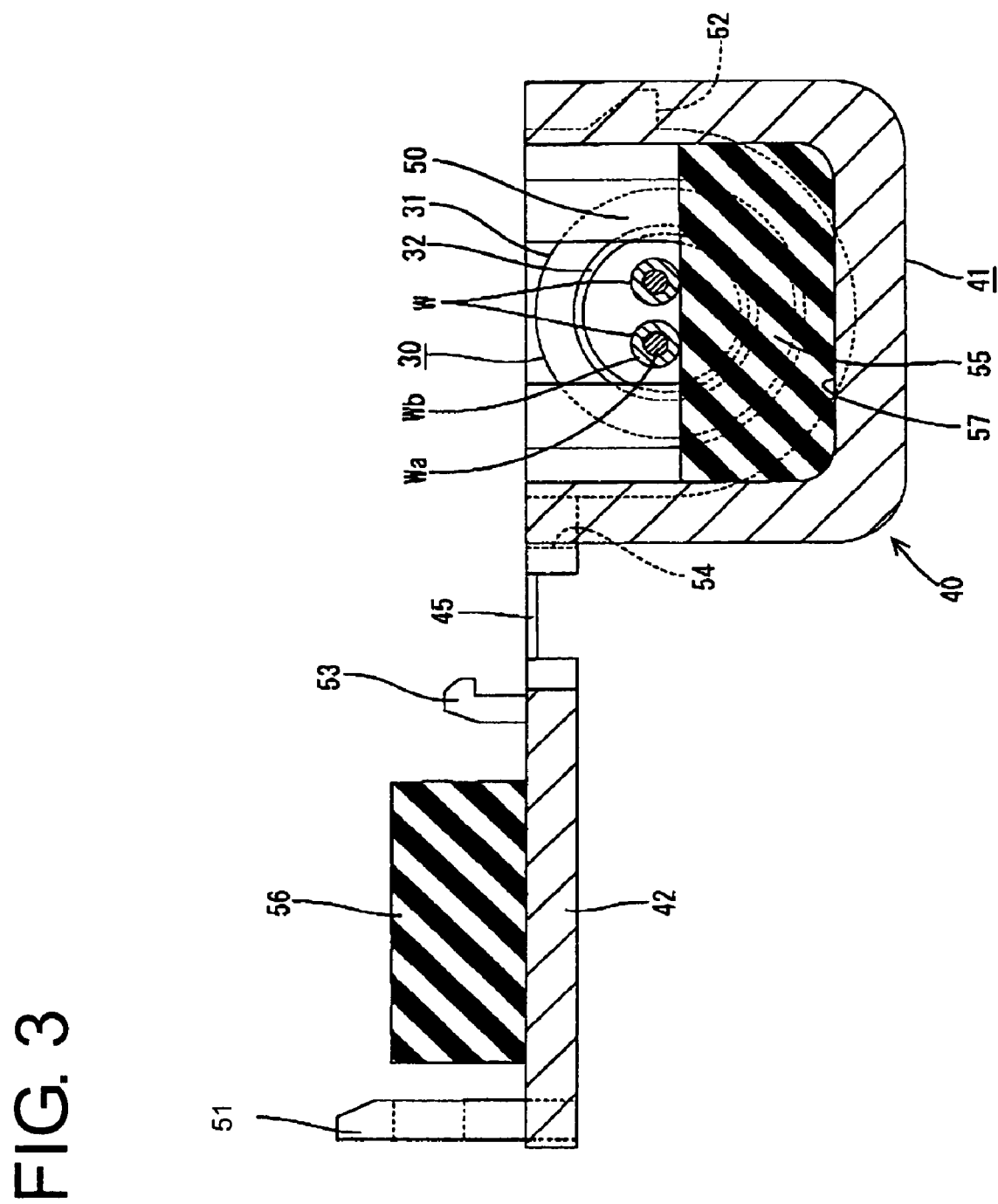
FIG. 3 is a section along 3—3 of FIG. 2 showing a state where a lid is open.
Figure 4:
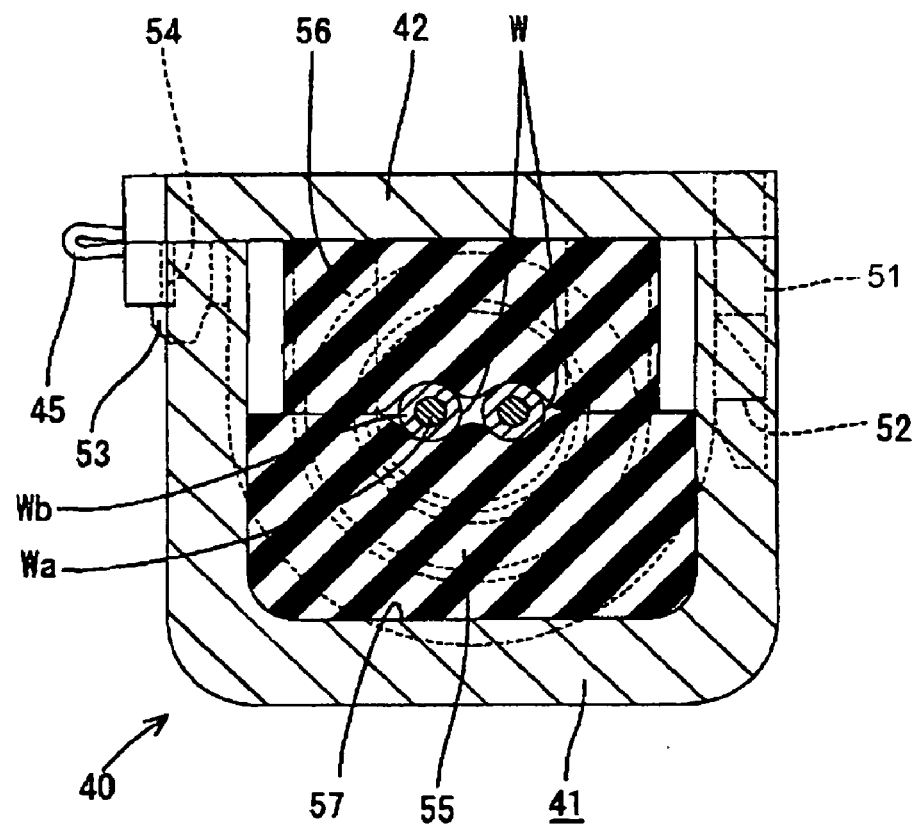
FIG. 4 is a section similar to FIG. 3, but showing the lid closed.

The lid 42 is closed with respect to the main body 41 by bending the hinge 45, as shown in FIG. 3, after the corrugate tube 30 is held temporarily in the cover 40. Thus, the rubber plate 56 of the lid 42 enters the main body 41 to contact both the wires W and the rubber plate 55 of the cover main body 41. Accordingly, the wires W are held resiliently and compressively between the two rubber plates 55, 56 from opposite sides. The holding arm 51 and the auxiliary holding arm 53 engage the holding portion 52 and the auxiliary holding hole 54, as shown in FIG. 4, when the lid 42 is closed properly. As a result, the lid 42 is held closed with respect to the cover main body 41.

At this time, the lid 42 closes the opening of the tube holding portion 44 and the locks 48 of the lid 42 engage the upper ends of the respective grooves 31 of the corrugate tube 30. Accordingly, the corrugate tube 30 is held firmly so as not to come out forward, backward and/or transversely. Further, the positioning portion 50 of the lid 42 is before the front end of the corrugate tube 30. In this state, the receptacle 12 and the protecting portions 22 of the female housing 10 bulge more sideways than the cover 40.

In this way, the corrugate tube 30 is fixed to the female housing 10 via the cover 40.

Ends of the wires W spaced from the female housing 10 may be connected to a device in an engine compartment or other location that is subject to frequent vibration. However, the vibration of the device is absorbed by the two rubber plates 55, 56 that resiliently hold the wires W, and the vibration is not transmitted along the wires W to the female terminal fittings 15 in the female housing 10. Thus, external vibration transmitted to the wires W will not adversely affect the female terminal fittings 15. Similarly, vibrations imparted to the wires W from locations between the ends of the wires W also can be absorbed.

As described above, vibration transmitted to the wires W is absorbed satisfactorily because the wires W are held resiliently between the rubber plates 55, 56. Further, the rubber plates 55, 56 are made of a material as soft as or softer than the insulation coatings Wb of the wires W. Thus, the wires W are not likely to be damage and the vibration can be absorbed satisfactorily.

A countermeasure against the vibration may not be necessary depending on the place where the connector is used. In such a case, the cover 40 can be used without mounting the rubber plates 55, 56. In short, since the rubber plates 55, 56 are separate from the cover 40, whether or not the rubber plates 55, 56 are mounted can be dealt with flexibly depending on the use of the connector, which can contribute to lower production costs.

A second embodiment of the invention is described with reference to FIGS. 5 to 8. The second embodiment shows a connector where the cover 40 is formed unitarily with springs 58, 59 instead of the rubber plates 55, 56 shown in the first embodiment. No repetitive description is given for elements with the same or similar construction as the first embodiment. Rather, those elements merely are identified by the same reference numerals.

Figure 5:
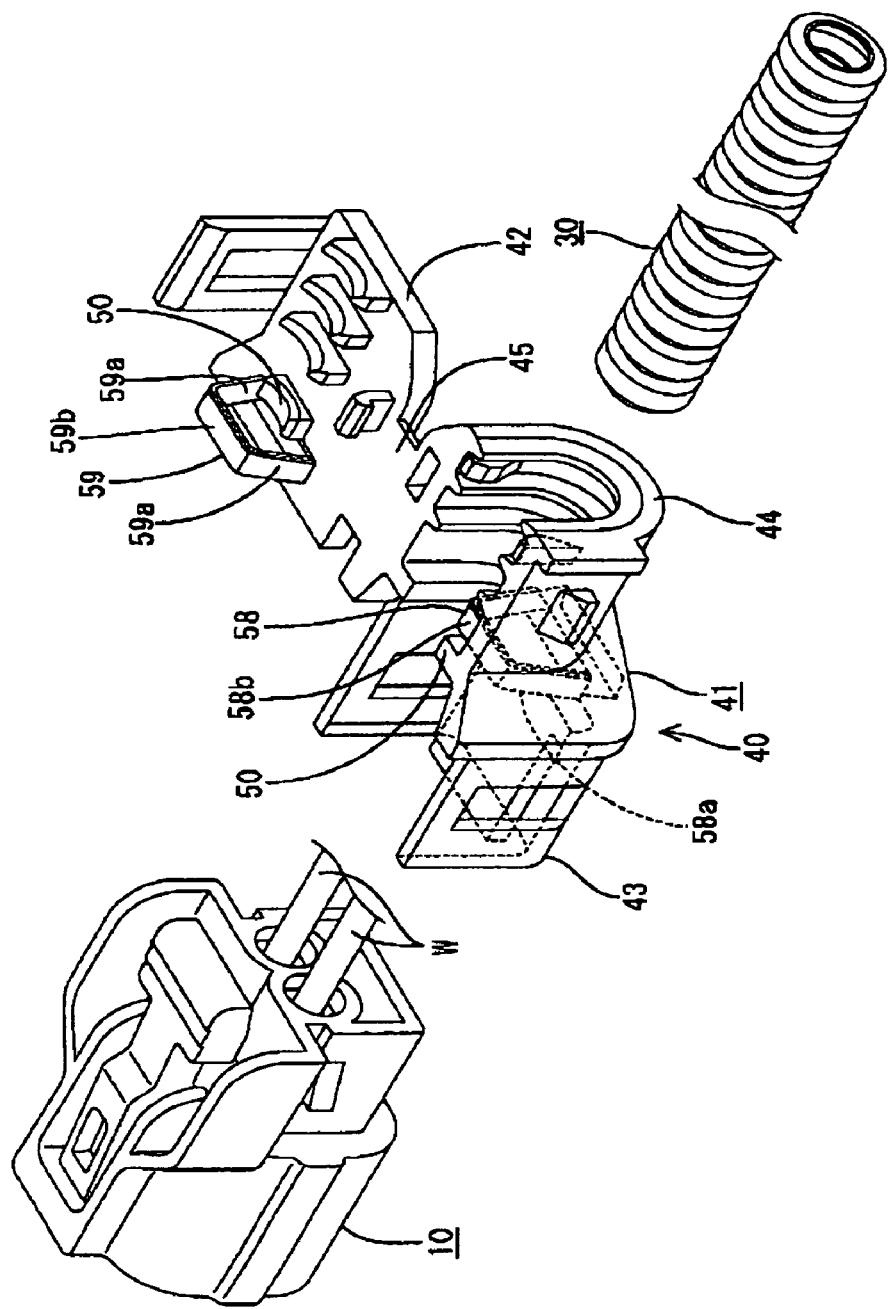
FIG. 5 is an exploded perspective view showing a connector according to a second embodiment of the present invention.
Figure 6:
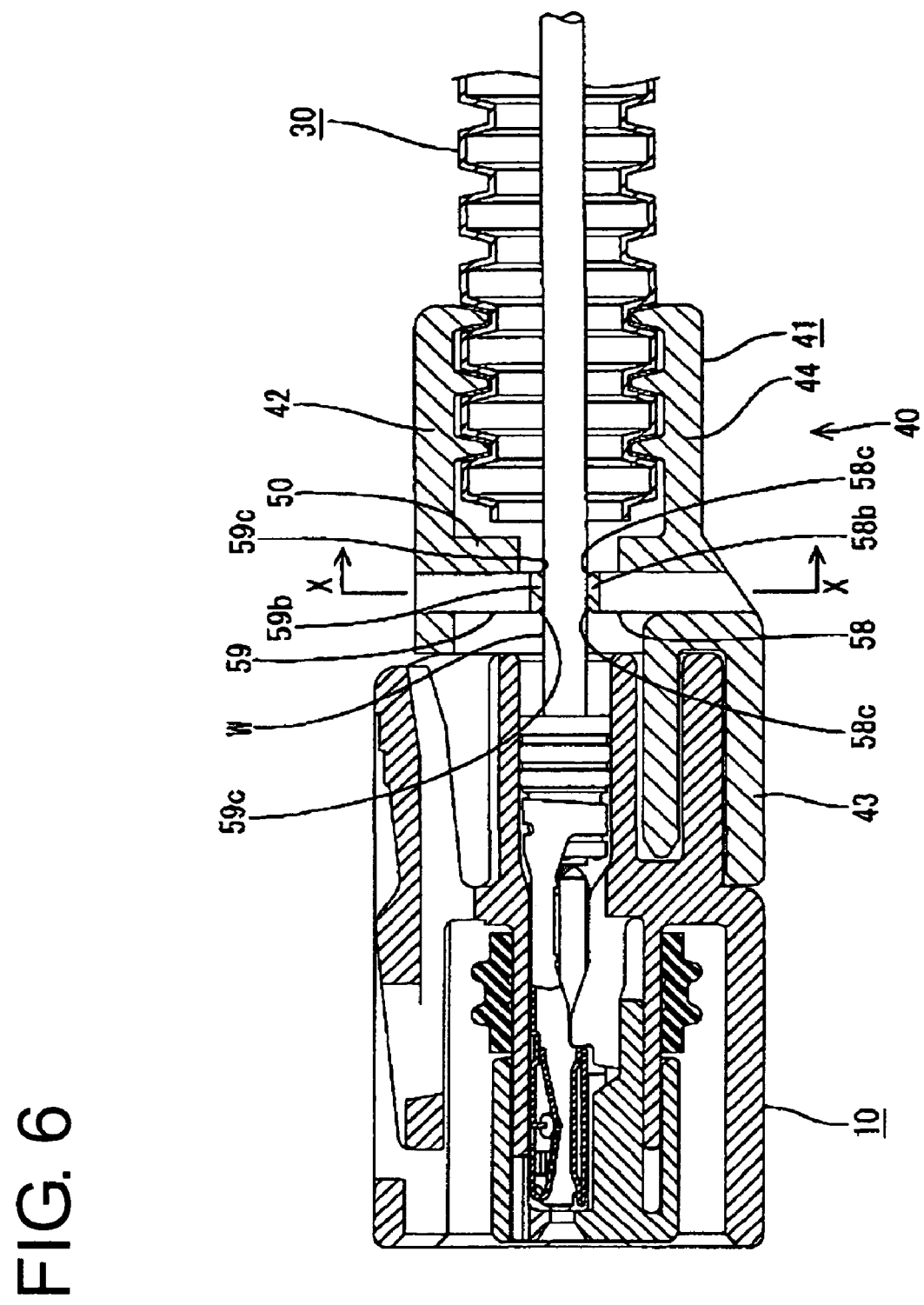
FIG. 6 is a side view in section showing the connector.
Figure 7:
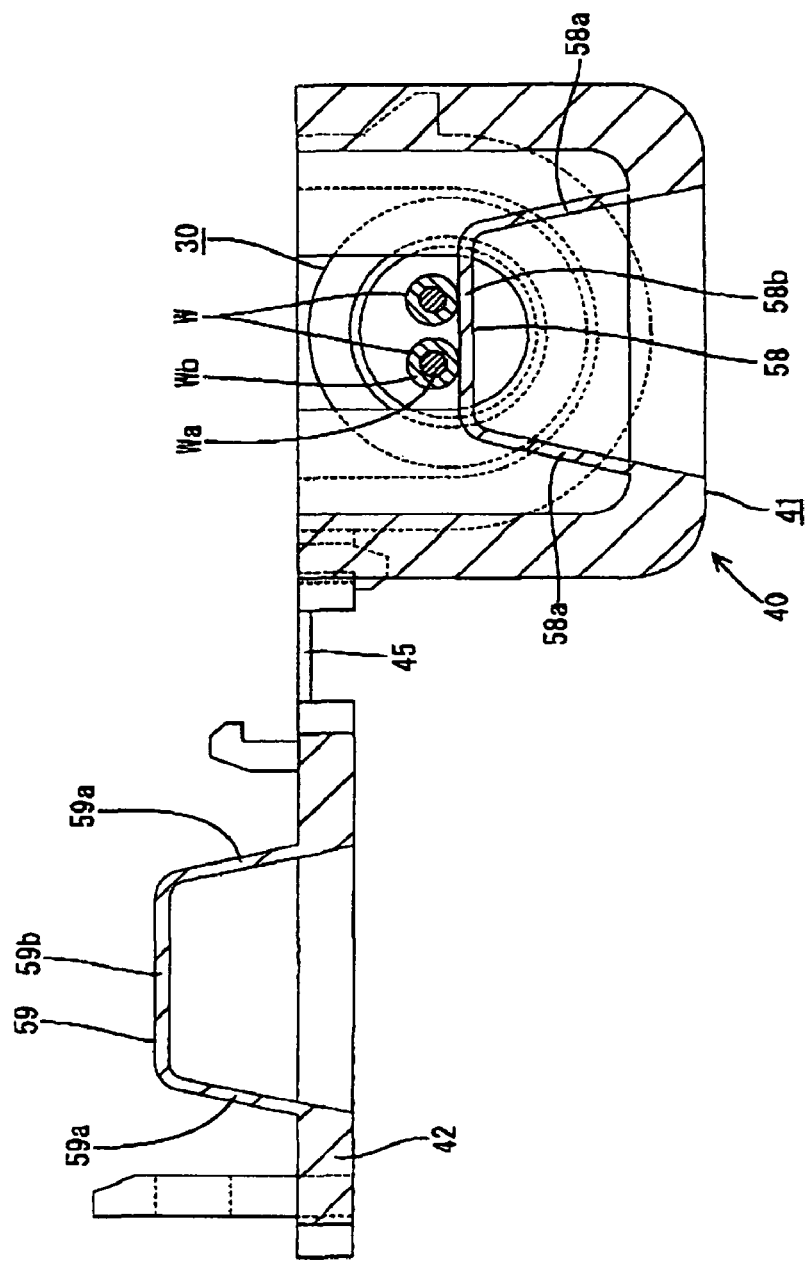
FIG. 7 is a section along 7—7 of FIG. 6 showing a state where a lid is open.

As shown in FIGS. 5 and 6, the spring 58 is formed unitarily at a portion of the main body 41 between the housing holding portion 43 and the tube holding portion 44, which is the portion substantially where the rubber plate mounting portion 57 is provided in the first embodiment. On the other hand, the spring 59 is formed unitarily at a position on the lid 42 immediately before the positioning portion 50, which is the portion substantially where the rubber plate 56 is secured in the first embodiment. Each spring 58, 59 is supported at both ends and is comprised of a pair of bases 58a, 59a standing from the bottom wall of the main body 41 or the lid 42. A coupling 58a, 59b couples the projecting ends of the bases 58a, 59a. Accordingly, the springs 58, 59 have substantially a U- or bridge-shape. The springs 58, 59 are resiliently deformable at least in a direction substantially normal to the longitudinal direction of the wires W. Thus, the bases 58a, 59a are displaceable substantially along widthwise directions and/or the couplings 58b, 59b are displaceable substantially along a vertical direction. Chamfered surfaces 58c, 59c are formed at the front and rear edges of the springs 58, 59 to avoid biting in the insulation coatings Wb of the wires W. The thicknesses and configurations of the bases 58a, 59a and/or couplings 58b, 59b are selected so that the springs 58, 59 are as resilient as or slightly softer or more resilient than the resin used for the insulation coating Wb of the wire W.

Figure 8:
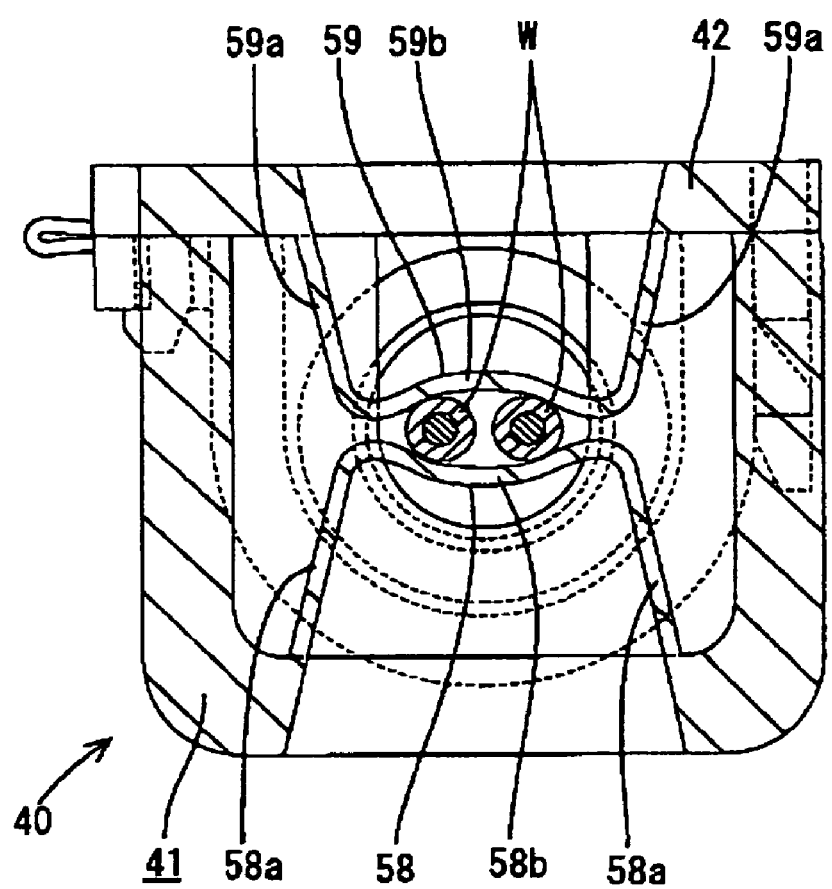
FIG. 8 is a section similar to FIG. 7, but showing the lid closed.

The housing-side holding portion 43 of the cover 40 is fixed to the female housing 10 and the corrugate tube 30 is held temporarily in the tube holding portion 44 in the same manner as in the first embodiment. The lid 42 then is closed. At this time, the wires W are placed on the coupling portion 58b of the spring 58 of the cover main body 41. When the lid 42 is closed from a state shown in FIG. 7, the spring 59 of the lid 42 contacts the wires W laterally, and the two springs 58, 59 are deformed resiliently as shown in FIG. 8 as the lid 42 is closed properly. As a result, the couplings 58b, 59b deform in substantially opposite directions with the wire(s) W sandwiched therebetween, and the bases 58a, 59a deform outward (see FIG. 8). The wires W are held resiliently between the two springs 58, 59 from substantially opposite side. In this way, vibration produced at the rear ends of the wires W is absorbed satisfactorily. Further, the chamfered surfaces 58c, 59c are formed at the front and rear of the springs 58, 59. Therefore, the insulation coatings Wb of the wires W are difficult to damage.

As described above, the springs 58, 59 are formed integrally or unitarily with the synthetic resin cover 40. Thus, production costs can be more reduced as compared to a case where the rubber plates 55, 56 separate from the cover 40 are used as in the first embodiment.

The invention is not limited to the above described and illustrated embodiments. For example, the following embodiments are also embraced by the technical scope of the present invention as defined by the claims. Beside the following embodiments, various changes can be made without departing from the scope and spirit of the present invention as defined by the claims.

Although the rubber plate of the lid is secured by adhesive in the foregoing first embodiment, forming a recess in the rubber plate and fitting a projection on the lid into this recess may secure it. A rubber plate holding construction by the engagement of projection and recess is also applicable to the rubber plate of the main body. Conversely, the rubber plate of the lid may be placed on the wires and the rubber plate of the main body and the lid may be closed in this state.

Although the rubber plates separate from the cover are used in the first embodiment, the cover may be formed integrally with resilient holding portions by means of two-color molding or co-molding using a soft resin material having softness similar to that of the rubber plates and a hard resin material to form the cover according to the present invention.

The form of the springs shown in the second embodiment may be arbitrarily set. For example, they may take the form of a cantilever. Moreover, the spring portions may be oriented differently within the cover.

Resilient holding portions are provided on the main body and the lid in the foregoing embodiments. However, the resilient holding portion may be provided only in the main body according to the present invention.

Besides the rubber plates and the springs described in the foregoing embodiments, tapes wound around the wires may serve as the resilient holding portions according to the present invention.

Although a watertight connector is illustrated in the foregoing embodiments, the invention is also applicable to nonwatertight connectors. The invention is also applicable to male connectors with a male housing for accommodating male terminal fittings. Further, the invention is applicable to connectors with a cover comprised of two half-pieces to be assembled together.

What is claimed is:

1. A fixing member for fixing a protection tube to a housing and for surrounding at least one wire drawn out from the housing and extending into the protection tube, the fixing member being form from a synthetic resin and the wire having an insulation coating thereon that is formed from a resin, the resin of the housing being relatively hard as compared to the resin of the insulation coating on the wire,
   wherein a pair of resilient plates are secured in the fixing member for resiliently holding the wire therebetween, the resilient plates being formed from a soft resin with a hardness approximately equal to or slightly softer than the resin of the insulation coating of the wire for absorbing vibration and preventing damage to the insulation coating of the wire.

2. A fixing member for fixing a protection tube to a housing and for surrounding at least one wire drawn out from the housing, wherein the fixing member comprises at least one holding portion for resiliently holding the wire, the resilient holding portion comprises a pair of substantially bridge-shaped springs that can hold the wire therebetween, each bridge-shaped spring having a pair of base ends formed unitarily in the fixing member and a coupling extending between the base ends.

3. The fixing member of claim 2, wherein chamfered surfaces are formed at front and rear edges of the springs.

4. The fixing member of claim 2, wherein the springs are formed into a substantially U-shape.

5. The fixing member of claim 2, wherein the resilient holding portions have a hardness about equal to or slightly softer than a hardness of an insulation coating of the wire.

6. The fixing member of claim 1, further comprising at least one positioning portion that bulges more inward than a front end of the protection tube.

7. The fixing member of claim 6, wherein the positioning portion positions the wire to a position more inward than the front end of the protection tube.

8. The fixing member of claim 1, further comprising temporary holding means for temporarily holding the protection tube during mounting.

9. A connector comprising:
   a housing;
   a protection tube for surrounding at least one wire drawn out from the housing, the wire having an insulation coating with a selected harness;
   a fixing member for fixing the protection tube to the housing and surrounding portions of the wire extending from the housing to the protection tube, the fixing member being formed from a synthetic resin; and
   a pair of resilient plates secured in the fixing member for surrounding the insulation coating of the wire therebetween, the resilient plates being formed from a resin material having a hardness approximately equal to or slightly softer than a hardness of the insulation coating on the wire.

10. A connector comprising:
    a housing;
    a protection tube for surrounding at least one wire drawn out from the housing; and
    a fixing member for fixing the protection tube to the housing, the fixing member comprising at least one resilient holding portion for resiliently holding the wire, the resilient holding portion comprises a pair of springs that can hold the wire therebetween, the springs each being formed unitarily in the fixing member and being formed into a substantially bridge-shape.

11. The connector of claim 10, wherein chamfered surfaces are formed at front and rear edges of the springs.

12. The connector of claim 10, wherein the springs are formed into a substantially U-shape.

13. The connector of claim 10, wherein the resilient holding portions have a hardness about equal to or slightly softer than a hardness of an insulation coating (Wb) of the wire (W).

* * * * *

UNITED STATES PATENT AND TRADEMARK OFFICE
CERTIFICATE OF CORRECTION

PATENT NO. : 6,971,905 B2
DATED : December 6, 2005
INVENTOR(S) : Yasumitsu Makita et al.

It is certified that error appears in the above-identified patent and that said Letters Patent is hereby corrected as shown below:

<u>Title page,</u>
Item [30], Foreign Application Priority Data, should read:
-- March 5, 2003     (JP) ………….2003-058287 --.

Signed and Sealed this

Seventh Day of February, 2006

JON W. DUDAS
*Director of the United States Patent and Trademark Office*